(12) United States Patent  
Lecompte

(10) Patent No.: US 9,199,679 B2  
(45) Date of Patent: Dec. 1, 2015

(54) SYNCHRONIZED MECHANICAL ROBOT

(76) Inventor: Mario Lecompte, Saint-Lambert (CA)

( * ) Notice: Subject to any disclaimer, the term of this patent is extended or adjusted under 35 U.S.C. 154(b) by 0 days.

(21) Appl. No.: 14/238,174

(22) PCT Filed: Aug. 23, 2012

(86) PCT No.: PCT/CA2012/000785  
§ 371 (c)(1),  
(2), (4) Date: May 13, 2014

(87) PCT Pub. No.: WO2013/026143  
PCT Pub. Date: Feb. 28, 2013

(65) Prior Publication Data  
US 2014/0239604 A1   Aug. 28, 2014

Related U.S. Application Data

(60) Provisional application No. 61/526,304, filed on Aug. 23, 2011.

(51) Int. Cl.  
*B62D 57/00* (2006.01)  
*B62D 57/032* (2006.01)  
*B62D 57/02* (2006.01)  
*B62D 57/024* (2006.01)

(52) U.S. Cl.  
CPC ............ *B62D 57/032* (2013.01); *B62D 57/022* (2013.01); *B62D 57/024* (2013.01)

(58) Field of Classification Search  
CPC .... B62D 57/02; B62D 57/022; B62D 57/024; B62D 57/028  
USPC ...................... 180/8.1, 8.2, 8.5, 8.6  
See application file for complete search history.

(56) References Cited

U.S. PATENT DOCUMENTS

| | | | | |
|---|---|---|---|---|
| 2,400,824 A * | 5/1946 | Jackson | ........................ | 180/8.2 |
| 3,196,970 A * | 7/1965 | Brenner | ........................ | 180/8.2 |
| 3,241,848 A * | 3/1966 | Flory | ........................... | 280/5.26 |
| 3,529,479 A * | 9/1970 | Ryan et al. | ..................... | 74/15.4 |
| 3,580,344 A | 5/1971 | Floyd | | |
| 4,790,548 A | 12/1988 | Decelles et al. | | |
| 6,964,309 B2 | 11/2005 | Quinn et al. | | |
| 7,249,640 B2 | 7/2007 | Horchler et al. | | |
| 7,396,023 B2 * | 7/2008 | Vlk | ............................. | 280/5.26 |
| 2006/0185911 A1 * | 8/2006 | Gunderson et al. | ............ | 180/8.3 |
| 2008/0251300 A1 * | 10/2008 | Frankie | ........................ | 180/8.2 |
| 2012/0059520 A1 * | 3/2012 | Kossett | ........................ | 700/264 |

OTHER PUBLICATIONS

PCT/Notification of transmittal of the International Search Report (ISR) and the Written Opinion of the International Searching Authority,or the Declaration—PCT/CA2012/000785(Form PCT/ISA/220)—Nov. 28, 2012—8 pages.

* cited by examiner

Primary Examiner — Tony Winner  
(74) Attorney, Agent, or Firm — Benoit & Cote Inc.

(57) ABSTRACT

The present document describes a robot for transforming a rotation movement into a vertical/horizontal displacement on the ground using legs, said robot comprising a chassis; a rotation shaft connected to said chassis; a plurality of leg modules connected to said shaft at a first end for rotating around said shaft; a plurality of legs, each of said legs being rotatably attached to one of said leg modules at a second end opposite the first end; a mechanism for keeping a lower surface of said legs horizontal to the ground as the robots rotates around the rotation shaft for allowing the robot to move on flat surfaces as well to climb stairs.

11 Claims, 12 Drawing Sheets

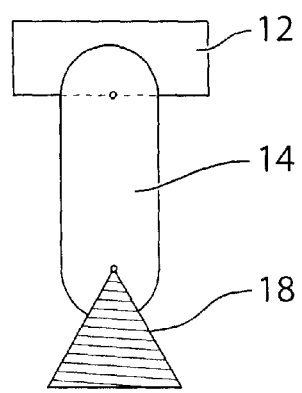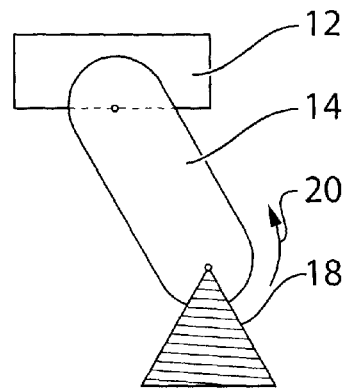
FIG.4a  FIG.4b
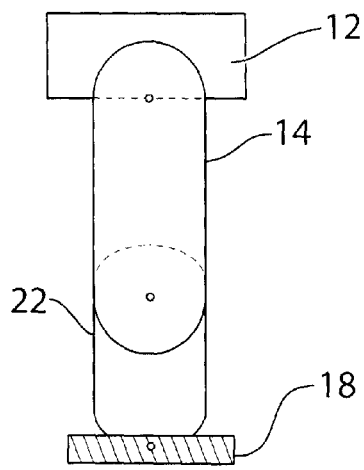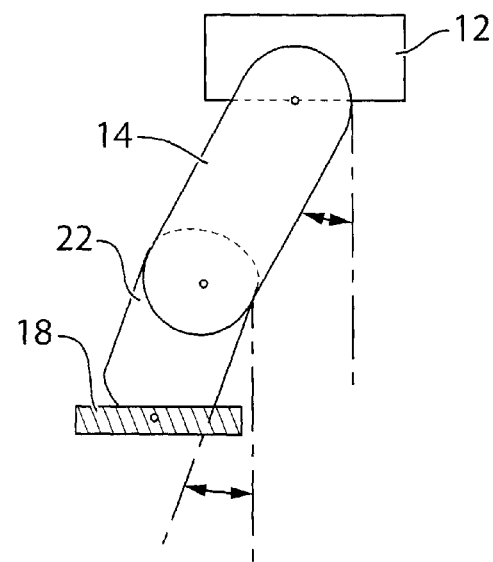
FIG.5a  FIG.5b

SYNCHRONIZED MECHANICAL ROBOT

CROSS-REFERENCE TO RELATED APPLICATIONS

This application claims priority from U.S. provisional patent application 61/526,304, filed on Aug. 23, 2011.

BACKGROUND (a) Field

The subject matter disclosed generally relates to a robot. More particularly, the subject matter relates to a robot having a synchronized gearing mechanism.

(b) Related Prior Art

Robots are used in a wide variety of domains including medical, military, industrial, household, and scientific explorations.

Motion of the robot is one of the main functions to implement when designing a robot. In recent years, motion of the robot has taken a very complicated approach especially if the robot is to be used on different types of surfaces such as flat surfaces and stairs.

Robots that have the ability to move on different types of surfaces include complicated systems to control their motion. These systems use sensors, and artificial intelligence embedded in a processor mounted on board of the robot. Examples of these types of robots are shown in U.S. Patent Publication No. 2008/0288128 (Gunderson), U.S. Patent Publication No. 2004/0168837 (Michaud), and U.S. Pat. No. 5,577,567 (Johnson).

Because of these design complications, the robots become expensive to buy and maintain, and thus, their use becomes cost prohibitive and limited.

Therefore, there is a need for robot which can be manufactured at low costs and which is able to move over flat surfaces and stairs without artificial intelligence.

SUMMARY

According to an aspect, there is provided a robot for transforming a rotation movement into a vertical/horizontal displacement on the ground using legs, said robot comprising: a chassis; a rotation shaft connected to said chassis; a plurality of leg modules connected to said shaft at a first end for rotating around said shaft; a plurality of legs, each of said legs being rotatably attached to one of said leg modules at a second end opposite the first end; a mechanism for keeping a lower surface of said legs horizontal to the ground as the robots rotates around the rotation shaft for allowing the robot to move on flat surfaces as well to climb stairs.

The number of leg modules may be two or more. In a preferred embodiment, the number of leg modules is three.

In one embodiment, at least one of the legs is rotatably attached to the corresponding leg module to keep its lower surface parallel to the ground by force of gravity. In this embodiment, the leg may have a triangular shape. In this embodiment, the robot is capable of moving on a horizontal surface and an inclined surface, and climbing up or down stairs.

In another embodiment, the leg is connected to the leg module using an arm, and the mechanism is a gearing mechanism for controlling the rotation of the leg around the arm at a speed and orientation that allow the lower surface of the leg to remain parallel to the ground as the leg rotates.

In a further embodiment, the leg modules are synchronized with each other. It is also possible to provide the leg modules at substantially equal angles around the rotation shaft.

In another aspect there is provided a robot for transforming a rotation movement into a vertical/horizontal displacement on the ground using legs, said robot comprising a chassis; a rotation shaft connected to said chassis; a plurality of leg modules connected to said shaft at a first end for rotating around said shaft; a plurality of legs, each of said legs being rotatably attached to one of said leg modules at a second end opposite the first end; a first mechanism for controlling height variation introduced to the legs by the movement of the robot; a second mechanism for controlling the orientation of the legs to keep a lower surface of said legs parallel to the ground; and a third mechanism for controlling a horizontal speed of the legs to compensate for the rotation of the leg module to which the leg is connected.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 4a and 4b illustrate an exemplary embodiment for maintaining the leg parallel to ground by force of gravity;

FIGS. 5a and 5b illustrate an exemplary embodiment for maintaining the leg parallel to ground using a gearing mechanism;

FIG. 8 is a fragmentary side view of the robot showing the gearing mechanism of FIG. 6 without the housing plate shown in FIG. 7a;

It will be noted that throughout the appended drawings, like features are identified by like reference numerals.

DETAILED DESCRIPTION OF THE PREFERRED EMBODIMENTS

The present document describes a synchronized mechanical robot which is capable of translating its rotation into a horizontal/vertical displacement on legs without artificial intelligence. The robot comprises a main rotation shaft, a plurality of leg modules provided around the rotation shaft, a leg corresponding to each leg module, and a gearing mechanism to rotate the legs at an appropriate angular speed and orientation to keep the legs in horizontal position with respect to the ground to allow the robot to move on a horizontal surface as well as to climb stairs. Due to the fact that the robot rotates on legs and not on wheels, and due to the centrifugal force caused by the rotation of the legs, some variations are introduced to the horizontal speed, orientation and height of the legs as the robot rotates. In an embodiment, the robot includes a mechanism for controlling these variations for a smoother displacement of the robot on the ground/stairs.

Figure 1:
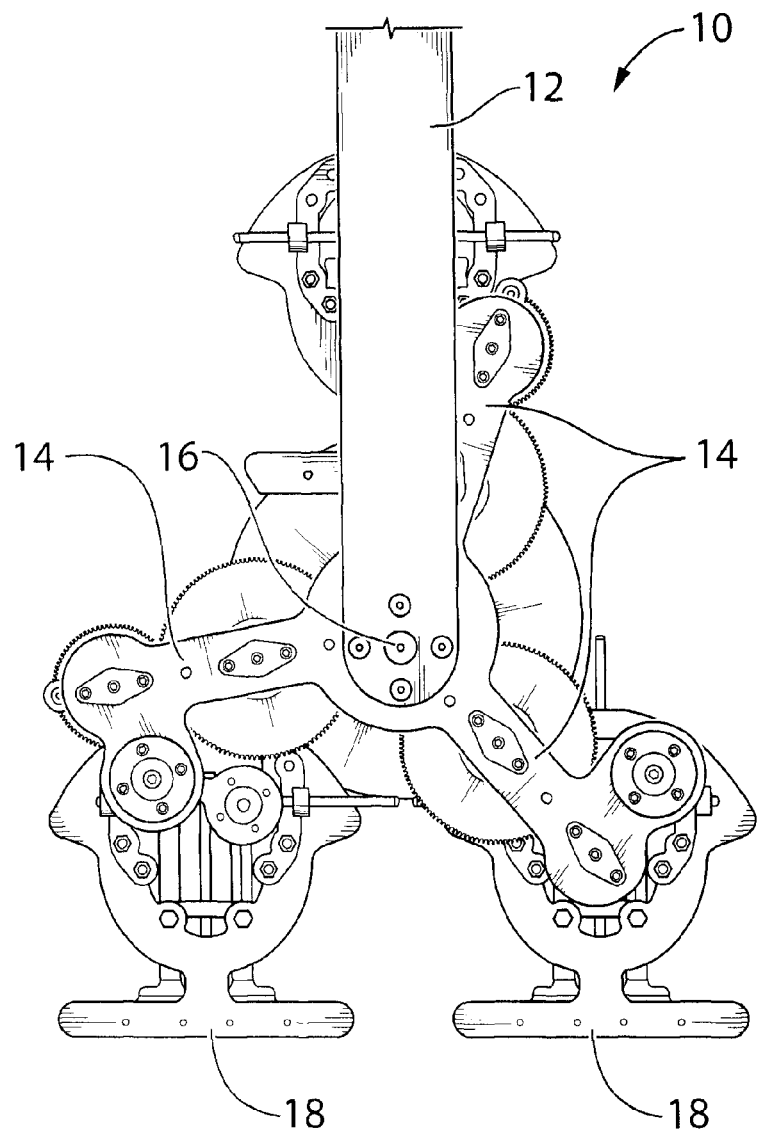
FIG. 1 is a side view of an exemplary robot in accordance with an embodiment of the invention.

Referring now to the drawings, FIG. 1 is a side view of a robot in accordance with an exemplary embodiment of the invention.

FIG. 1 shows a mechanical robot 10 comprising a chassis or main frame 12, and a plurality of leg modules 14 connected around a main rotation shaft 16. Each leg module 14 comprises a gearing module (not entirely shown in FIG. 1) and a leg 18. In an embodiment, movement of the robot 10 is provided externally. For example, a pushing force may be applied to the chassis 12 of the robot 10, or a rotation force may be applied to the rotation shaft 16 in order to rotate the robot 10 on the legs 18. During displacement of the robot 10, the legs 18 contact the ground in a substantially horizontal manner, in accordance with an embodiment.

The leg modules 14 are synchronized with each other. In an embodiment, the leg modules are provided at substantially equal angles around the rotating shaft 16. While the robot shown in the present embodiments includes three leg modules, it is to be understood that the design is not limited to only three leg modules. It is possible to use two, four or more than four leg modules without departing from this disclosure.

In an embodiment, the leg 18 is designed to remain horizontal to the ground regardless of the rotation position of the leg module 14 around the rotation shaft 16. In this manner, the robot 10 may move horizontally on a substantially flat surface and may also climb the stairs. This embodiment will be explained in further details with reference to FIGS. 2 and 3. It is to be noted that by saying that the leg remains parallel to the ground what is meant is that the lower surface of the leg which contacts the ground remains parallel to the ground for a smooth displacement of the robot.

Figure 2:
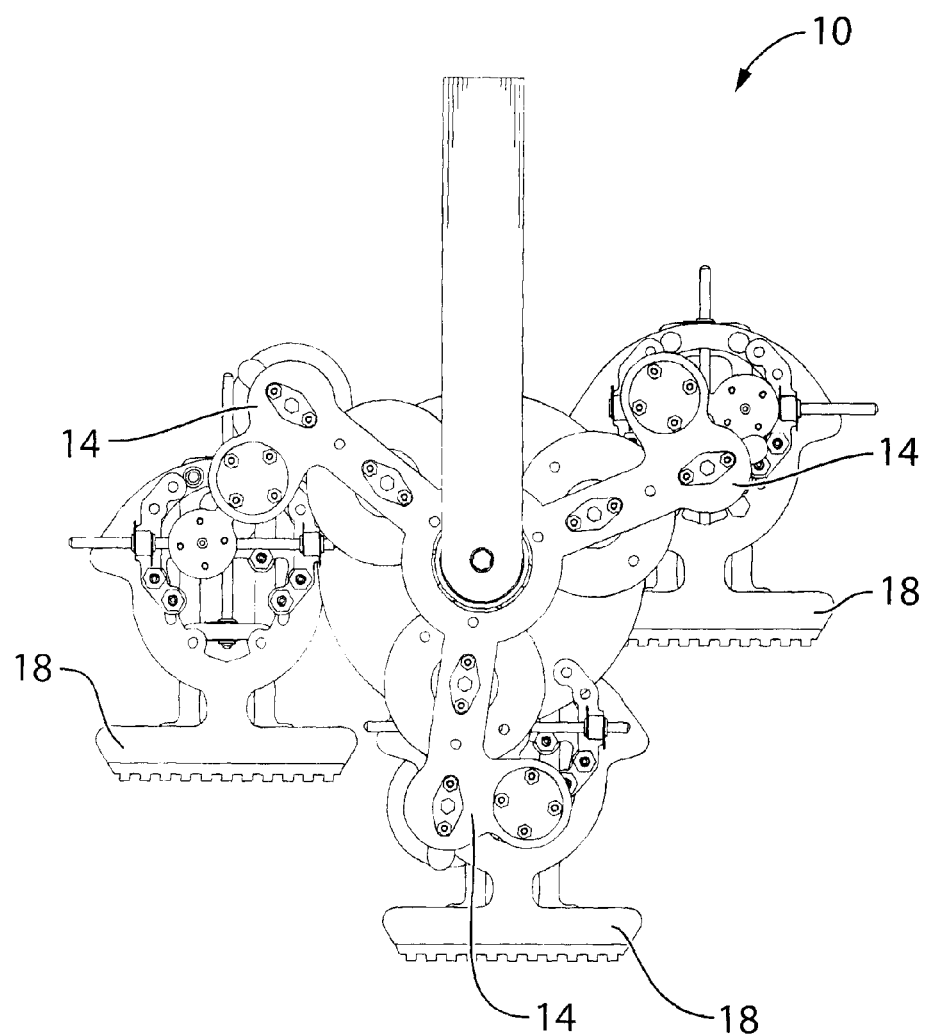
FIG. 2 is a side view of the robot exemplified in FIG. 1 showing the displacement of the robot on a horizontal surface.

FIG. 2 is a side view of the robot 10, showing the displacement of the robot on a horizontal surface. As shown in FIG. 2, the legs 18 are in a substantially horizontal position to the ground regardless of the position of the leg module 14. In other words, as the leg module 14 rotates around the rotation shaft 16, the lower surface of leg 18 remains parallel to the ground.

Figure 3:
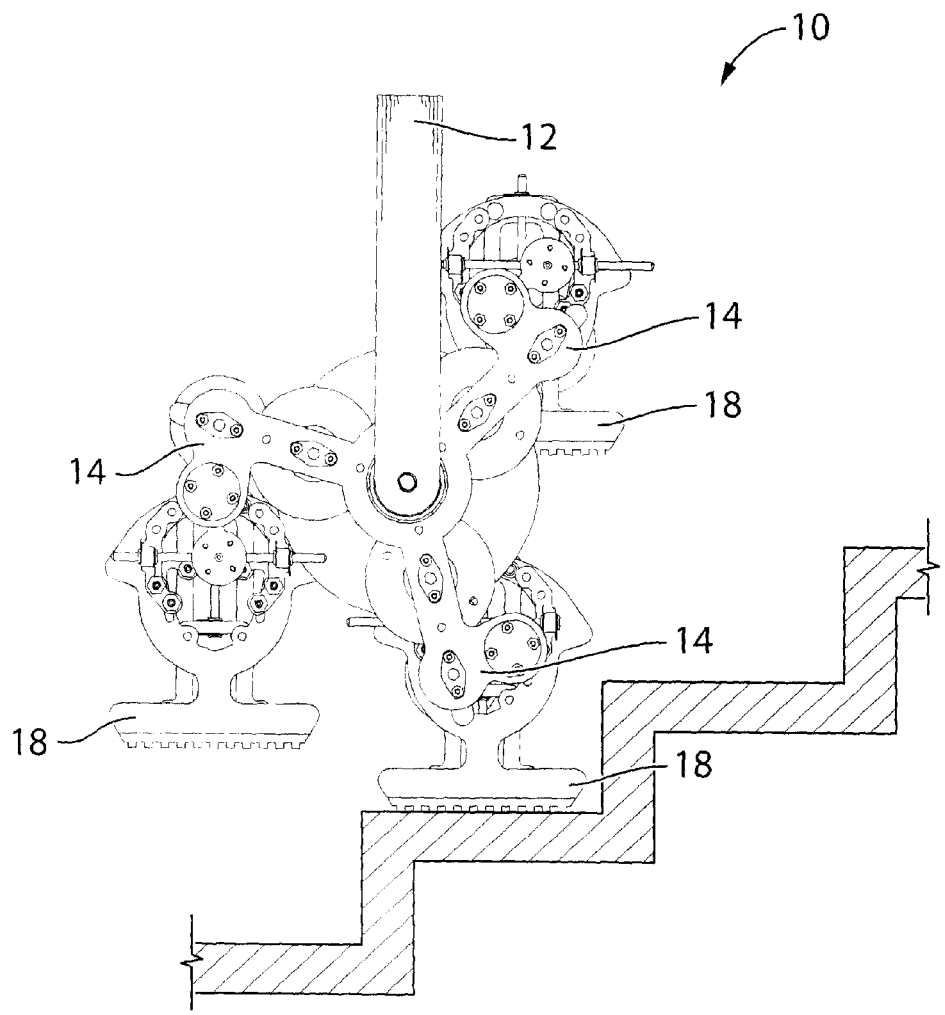
FIG. 3 is a side view of the robot exemplified in FIG. 1 showing the displacement of the robot on stairs.

FIG. 3 is a side view of the robot 10, showing the displacement of the robot 10 on stairs. As shown in FIG. 3, the legs 18 are always substantially horizontal relative to the ground in any position of the leg module 14. In an embodiment, the horizontal and vertical displacement of the robot 10 is calculated in accordance with the depth and height of the stairs so that the robot maintains a continuous movement on the stairs without requiring adjustment.

Maintaining the legs in a horizontal manner may be achieved in many ways.

In one embodiment, the leg may be shaped to remain parallel to the ground by force of gravity. An example of how this embodiment may be implemented is illustrated in FIGS. 4a and 4b. For the purpose of simplicity, FIGS. 4a and 4b are intended to illustrate the concept in a general manner without limiting the design to the parts illustrated in the figures. Someone skilled in the art would appreciate that further modifications may be incorporated into the design without departing the scope of this disclosure.

As shown in FIGS. 4a and 4b, a leg module 14 is rotatably attached to the chassis 12 of the robot at one end, and to a leg 18 at the other end. The leg 18 must have a shape that allows it to remain parallel to the ground when it is rotatably mounted to the leg module 14. For example, the leg 18 may have a triangular shape and may be ratably attached to the leg module 14 at or in the vicinity of one of its vertices as shown in FIGS. 4a and 4b. As the leg module 14 rotates around the rotation shaft 16 (shown in FIG. 1), the leg 18 tends to remain parallel to ground by virtue of its weight and the way it is attached to the leg module 14.

In FIG. 4a, the leg module 14 is shown to be in a vertical position to the ground with the leg 18 parallel to the ground. In FIG. 4b, the leg module 14 rotated counterclockwise following arrow 20. The leg module 14 is no longer perpendicular to the ground, however, the lower surface of the leg 18 remains parallel by force of gravity and the way the leg 18 is attached to the leg module 14.

In another embodiment, the robot 10 may include a mechanical memory for maintaining the leg 18 in a horizontal manner. In the present embodiment, the leg 18 may be kept parallel to the ground using a gearing mechanism. An example of how this embodiment may be implemented is illustrated in FIGS. 5a and 5b. For the purpose of simplicity, FIGS. 5a and 5b are intended to illustrate the concept in general without limiting the design to the parts illustrated in the figures. Someone skilled in the art would appreciate that further modifications may be incorporated into the design without departing the scope of this disclosure.

In the embodiment shown in FIGS. 5a and 5b, the leg module 14 is rotatably attached to the chassis 12 of the robot, and the leg 18 is rotatbly attached to the leg module 14 using an arm 22. Although not shown, the system includes a gearing mechanism that governs the rotation of the leg 18 in order to keep the bottom thereof parallel to the ground as the arm 22 and the leg module 14 rotate.

Figure 6:
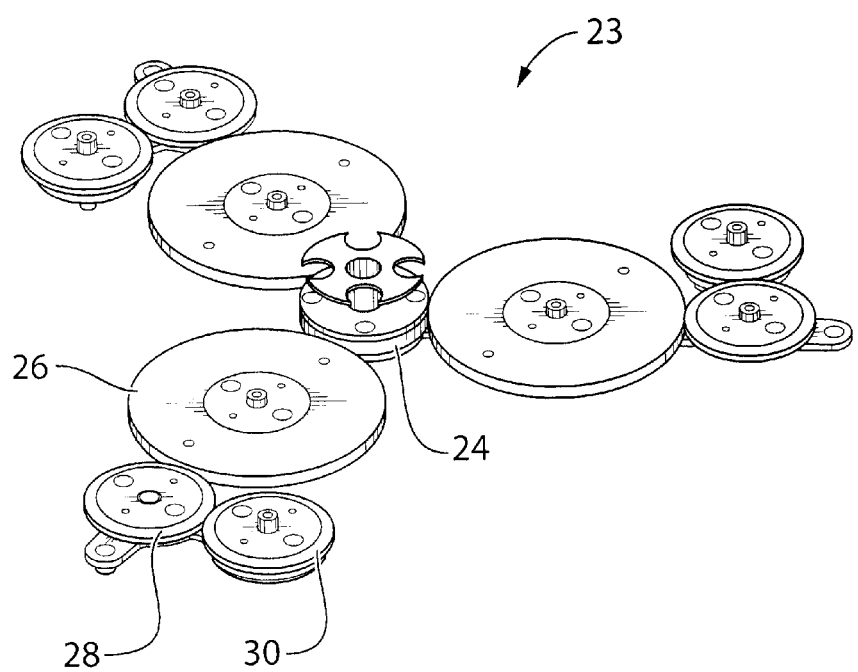
FIG. 6 illustrate an exemplary embodiment of a gearing mechanism that may be used in the embodiment shown in FIGS. 5a and 5b.

An example of a gearing mechanism that may be implemented in the embodiment of FIGS. 5a and 5b is shown in FIG. 6. As shown in FIG. 6, the gearing mechanism 23 includes three leg modules 14 equally spaced around the rotation shaft. Each leg module 14 includes four gears: a central gear 24 shared by the all the leg modules, a second gear 26, a third gear 28 and a fourth gear 30. In the embodiment shown in FIG. 6, gear 30 is not aligned with the other gears. Gear 30 is positioned to form an L shape with the other gears in order to reduce the length of the leg module. The gears may be positioned to form different shapes without departing from the scope of this disclosure.

Figure 7A:
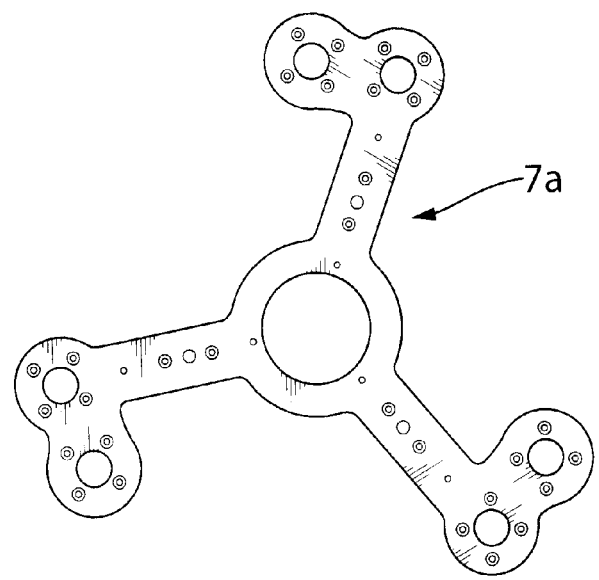
FIGS. 7a and 7b are exemplary illustrations of housing plates on which the gears may be mounted.
Figure 7B:
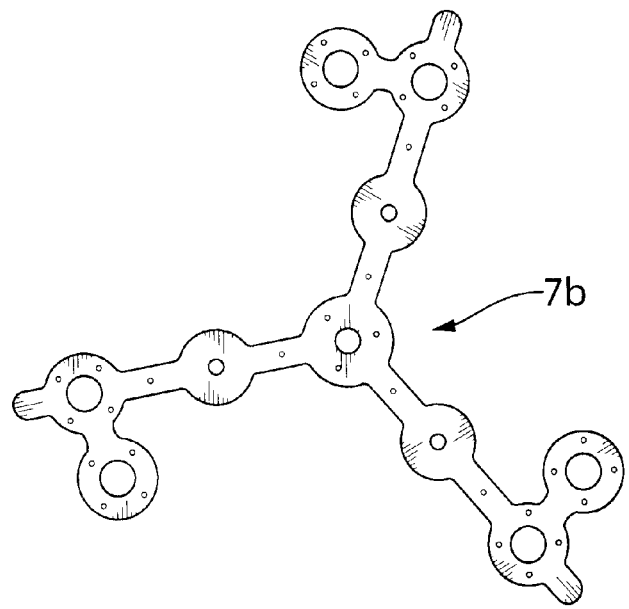
Figure 8:
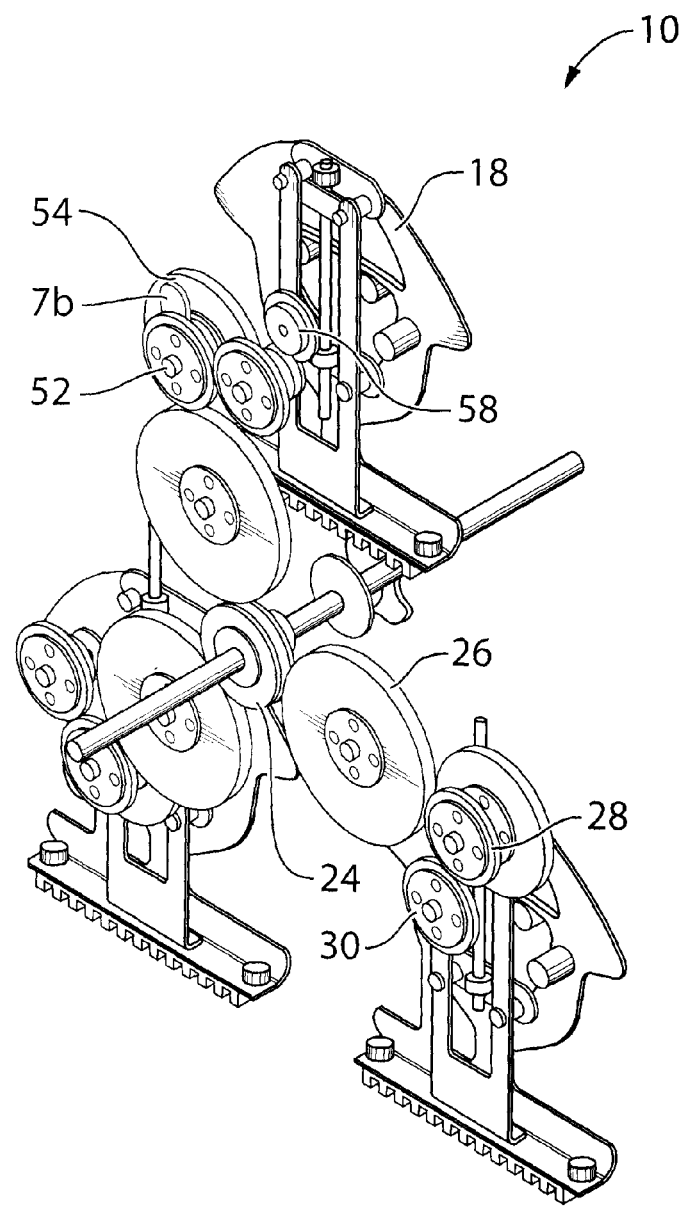

The gears may be mounted on the robot between two housing plates 7a and 7b as exemplified FIGS. 7a and 7b, respectively. FIG. 8 is a fragmentary side view of the robot 10 showing the gearing mechanism 23 without the housing plate shown in FIG. 7a.

In the embodiment shown in FIG. 6, gears 24, 28, and 30 are identical. Gear 26 is twice the width of the other gears. In an embodiment, gears 24, 28, and 30 have a diameter of 3 inches, and gear 26 has a diameter of 6 inches. Accordingly, the distance between the centre or rotation of gear 28 and gear 24 is 9 inches, and the distance between the centre of rotation of gears 28 and 30 is 3 inches. In an embodiment, the distance between gear 30 and the central gear 24 is the same as the distance between gear 28 and the central gear 24.

Someone skilled in the art would understand that various changes may be effected to the design shown in FIG. 6. For instance, the gear 26 may be replaced by three gears having a diameter of 2 inches each. It is also contemplated that the gears may be replaced by chains.

Referring back to the gearing mechanism 23 of FIG. 6. In this embodiment, the central gear 24 is connected to the chassis and does not rotate. This way when the robot rotates the chassis remains parallel with respect to the ground and the leg modules 14 will rotate around the central gear 24. Therefore, when a leg module 14 rotates with a rotation speed ω, gears 24 and 28 will have a rotation speed of zero with respect to the ground, and −ω with respect to the leg module, and gear 30 will have a rotation speed of 2ω with respect to the ground.

It is possible to use gears 28 and 30 to control the rotation speed and orientation of the leg 18. However, due to the fact that the robot moves on legs and not on wheels, and due to the centrifugal force caused by the rotation of the legs, some variations in speed, height and horizontal orientation is introduced to the leg of the robot, which cause vibration in the movement of the leg if the leg is directly connected to the gears 28 and 30. Therefore, a mechanism is needed to reduce/eliminate these vibrations.

In the present embodiment the leg should remain parallel to the ground as the robot rotates, and at the same time the leg should rotate with a speed that is twice the speed of the leg module 14 in order to compensate for the rotation of the leg module 14. Accordingly, rotation of the leg module 14 transmits two instructions/messages to the leg 18: maintaining the same orientation (horizontal direction parallel to the ground), and rotating at a speed that is double the speed of the leg module. Therefore, there is a need for a mechanism for each function.

Figure 9:
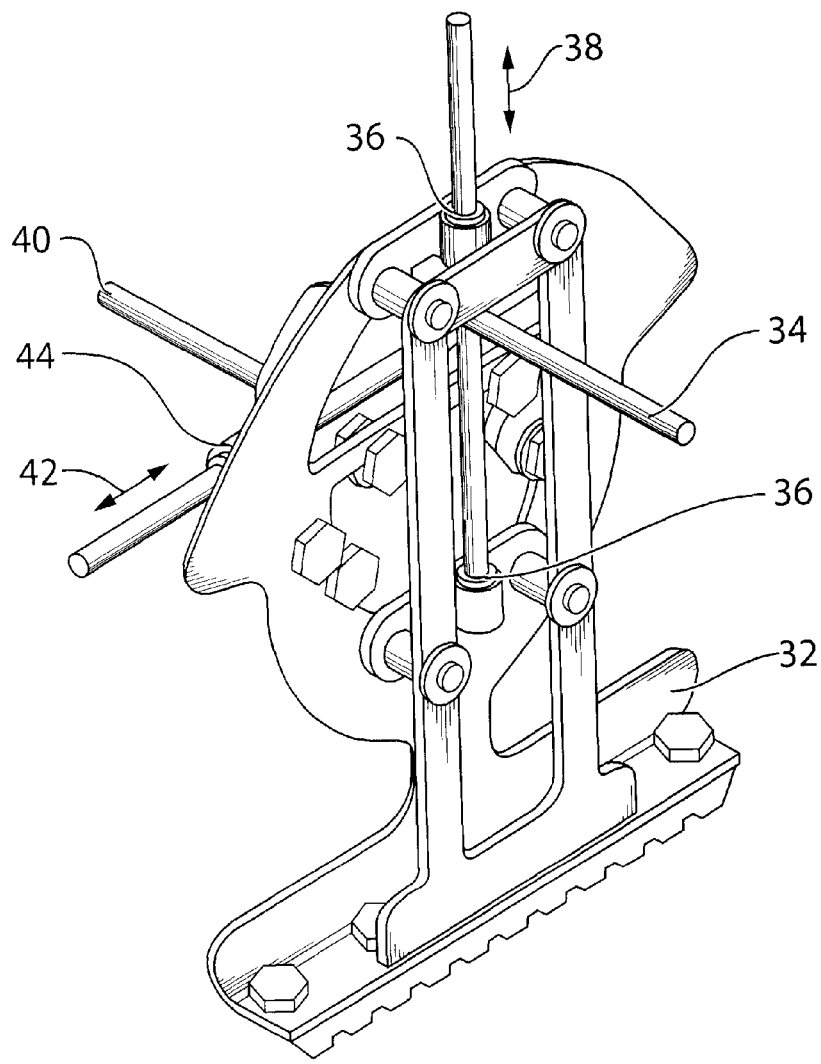
FIG. 9 is a side view of a leg that may be used in order to reduce the variations in speed and orientation in accordance with an embodiment of the invention.

FIG. 9 is a side view of an embodiment of a leg 32 that may be used in order to reduce these variations in speed, orientation and height.

As shown in FIG. 9, the leg 32 includes a T shaped rod 34 mounted vertically on the leg 32 between two linear bearings 36 which allow the rod 34 to move up and down between the bearings 36 without affecting the height of the leg 32. Accordingly, the rod 34 may be used to control the horizontal speed, and the orientation of the leg 32. In the embodiment shown in FIG. 9, orientation of the leg and the horizontal speed thereof are controlled by the same rod 34 on the same side of the leg 32. However, the design is not limited to this embodiment. Further modifications may be made without departing from the scope of this disclosure.

In order to control the height variation introduced to the movement of the leg 32 by the movement of the robot, another T-shaped rod 40 is provided horizontally on the leg 32 between two linear bearings 44. The T-shaped rod 40 can move forward and backward between the two bearings 44 as indicated by arrow 42 without affecting the horizontal speed, or the orientation of the leg 32. Accordingly, the rod 40 may be used to control the height variation of the leg 32. In the present embodiment, the maximum height variation is 6.25% as will be described later with reference to Annex 1.

Figure 10:
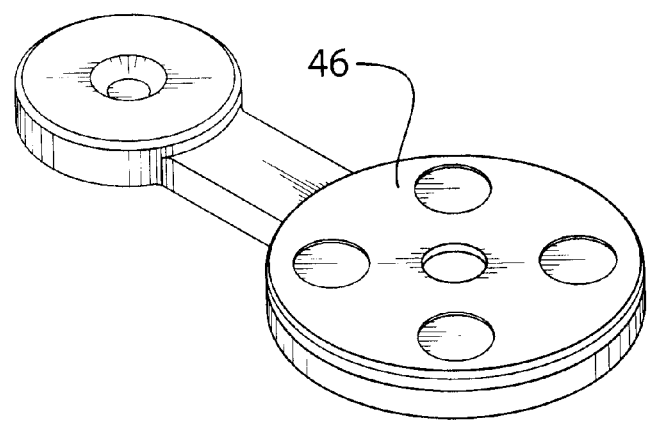
FIG. 10 is an elevational view of an arm that may be used for connecting the leg to the leg module.

The rods 34 and 40 connect the leg 32 to the corresponding leg module 14 using an arm such as the arm 46 exemplified in FIG. 10.

Figure 11:
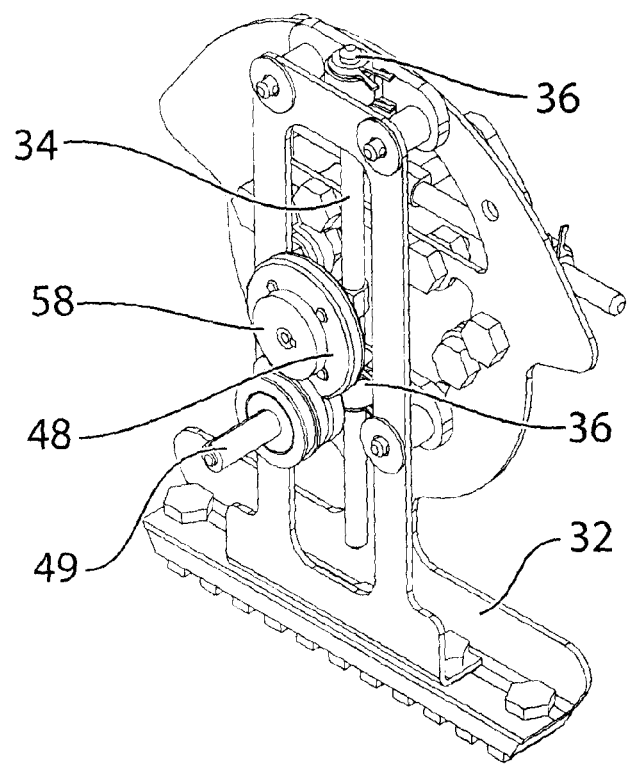
FIG. 11 is a side view of the leg of FIG. 9 showing the vertical rod connected to the gearing mechanism by an arm similar to that shown in FIG. 10.
Figure 12:
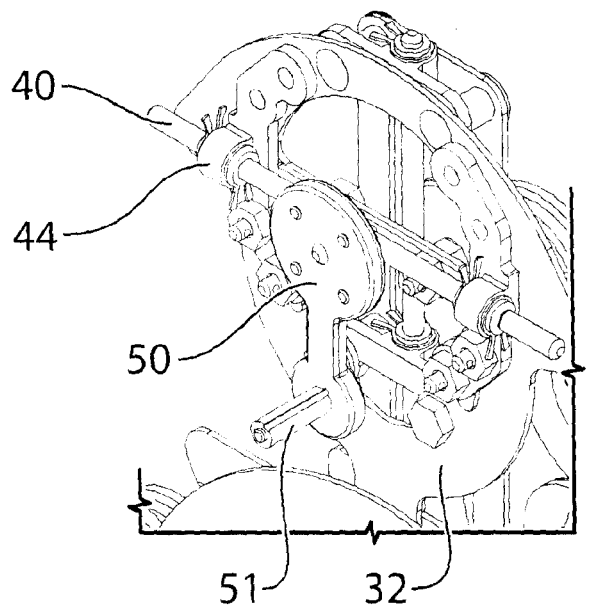
FIG. 12 is a side view of the leg of FIG. 9 showing the horizontal rod connected to the gearing mechanism by an arm similar to that shown in FIG. 10.

FIG. 11 is a side view of the leg 32 showing the vertical rod 34 connected to the gearing mechanism by an arm 48 to control the horizontal speed, and the orientation of the leg 32. FIG. 12 is a side view of the leg 32 showing the horizontal rod 40 between linear bearings 44 and connected to the gearing mechanism by an arm 50 to control the height variation of the leg 32 during movement of the robot.

Referring back to the control of horizontal speed and orientation of the leg 32. As discussed above, the leg 32 should rotate in a speed that is twice the rotation speed of the leg module 14, and should also remain parallel to the ground as it rotates. Therefore, the arm 48 for the control of horizontal speed is connected to a shaft 49 having a rotation speed which is twice the rotation speed of the leg module 14. The mechanism that transfers this speed of rotation to the shaft 49 will be described in detail hereinbelow with reference to FIG. 13.

Figure 13:
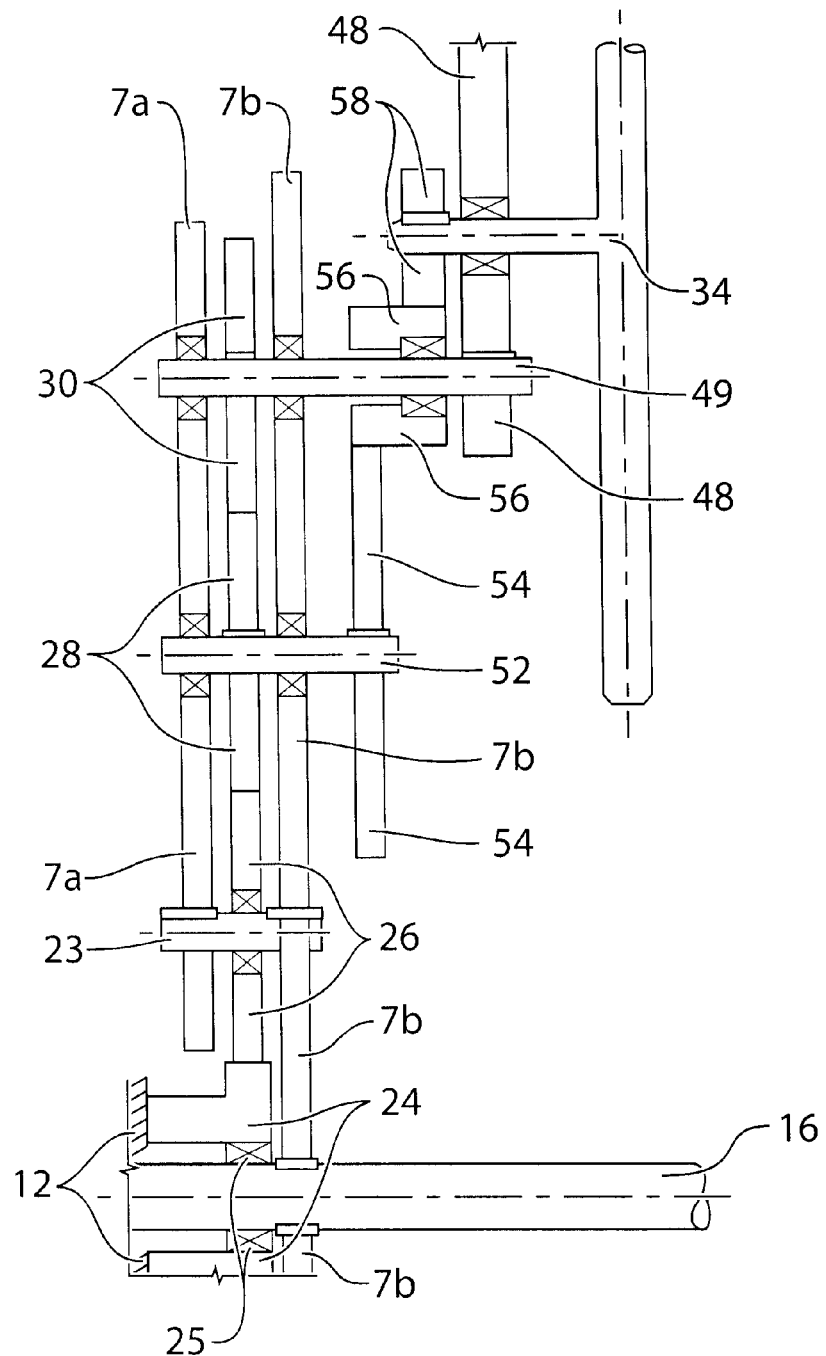
FIG. 13 is a cross sectional view of the gearing mechanism used for the control of horizontal speed and orientation of the leg, in accordance with an embodiment.
Figure 14:
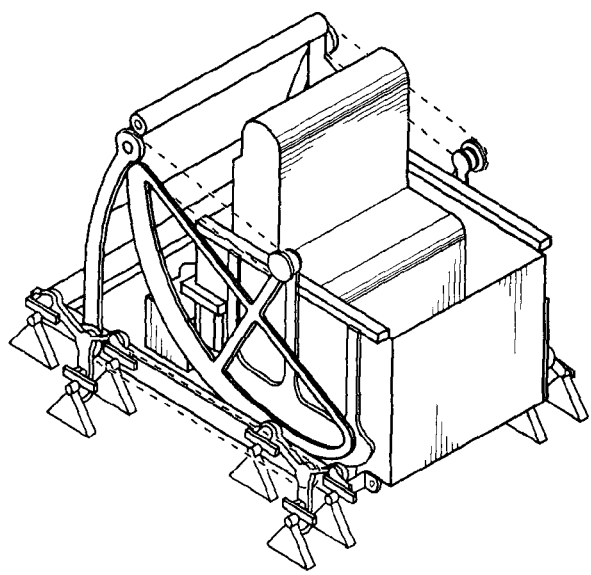
FIG. 14 is an elevated side view of an exemplary robot in accordance with an embodiment of the invention.

FIG. 13 is a cross sectional view of the gearing mechanism used for the control of horizontal speed and orientation of the leg 32, in accordance with an embodiment.

Starting with the mechanism for controlling the horizontal speed, FIG. 13 shows the central gear 24 welded or clamped to the chassis 12, and connected to the rotation shaft 16 by a bearing 25. As discussed above, the central gear 24 does not rotate and thus, the speed of the central gear 24 is −ω with respect to the leg module and zero with respect to the ground. The central gear 24 is connected to the second gear 26. The gear 26 has a speed of 2ω with respect to ground and ω with respect to the leg module. The third gear 28 which is connected to gear 26 copies the movement of the central gear 24, and thus, has a speed of zero with respect to ground and −ω with respect to the leg module 14. In turn, the gear 30 has a speed of 2ω with respect to ground and ω with respect to the leg module similar to gear 26. As shown in FIG. 13, the gear 30 is clamped to the shaft 49. The shaft 49 is also clamped to the arm 48, which is connected to the T-shaped rod 34 of the leg 32, as shown in FIG. 11.

This way the leg 32 can rotate around the shaft 49 at a speed of 2ω with respect to ground using a mechanical memory embodied in the mechanism, without the use of artificial intelligence and sensors.

FIG. 13 also shows the mechanism for controlling the orientation of the leg 32, in order to maintain the leg 32 parallel to the ground as described earlier, to facilitate movement of the robot on flat surfaces and on stairs.

As shown in FIG. 13, the gears 24 to 30 are provided between housing plates 7a and 7b. The housing plates 7a and 7b are clamped to shaft 23, and housing plate 7b is clamped to the rotation shaft 16 which rotates within the inner circumference of the central gear 24 using bearing 25. Therefore, the housing plates have the same rotation speed as the rotation shaft 16 and the leg module 14.

As shown in FIG. 13, the third gear 28 is clamped to a shaft 52. As discussed above, the third gear 28 has a speed of zero with respect to the ground and −ω with respect to the leg module 14. Also clamped to the shaft 52 is a gear 54. Therefore, the gear 54 has the same speed as the third gear 28. Gear 54 is connected to a gear 56. The diameter of gear 56 is third that of gear 54. Subsequently, the speed of gear 56 is 4ω with respect to the ground, and 3ω with respect to the leg module 14. Gear 56 is connected to a gear 58. The speed of gear 58 is −3ω with respect to the leg module and zero with respect to the ground. Calculation of the rotation speed with respect to the ground for gear 58 is done as follows: the gear 58 is rotatably connected to gear 56, therefore the rotation speed with respect to the leg module 14 is −3ω. At the same time, the gear 28 is connected to the arm 48 having a speed of 2ω with respect to the ground, added to a speed of ω from the leg module. Therefore, the total rotation speed with respect to the ground is: −3ω+ω+2ω=0.

Therefore, the gear 58 is clamped to the rod 34 in order to maintain the same orientation with respect to the ground, which in the present embodiment, is a horizontal orientation parallel to the surface on which the robot is moving.

Accordingly, the mechanism shown in FIG. 13 allows the leg 32 to rotate at a speed of 2ω around the shaft 49 using the arm 48, and at the same time, the leg 32 always maintains the same orientation with respect to the ground because the rod 34 has zero rotation with respect to the ground.

A mechanism similar to that shown in FIG. 13 may be used to control the height variations of the leg 32 by connecting the horizontal rod 40 to an arm 50, and reducing the height variations through the shaft 51 which is connected to the arm 50. In an embodiment the length of the arm 50 is twice that of the arm 48.

As discussed above, because the robot moves on legs and not on wheels, a variation in height and horizontal speed is introduced into the legs of the robot when the robot is in motion.

The main variables that affect the height are listed in Table 1. The term "symmetry" should be understood as meaning that: The angle between the arm (from the arm rotation shaft) and the horizontal plane must be 90 degrees when the arm rotation shaft and the main shaft are both on the same vertical plane. Also, the definition of the term "point of return" should be understood as being the position of the legs when the load is transferred from a foot to another. This occurs when two feet of a total of N feet are on the ground at the same time. The leg at the left with a foot on the ground is considered at the point of return.

TABLE 1

| Variable Name | Type | Description |
| --- | --- | --- |
| N | Number | Number of legs |
| C1 | Number | Condition 1: point of return |
| C2 | Number | Condition 2: symmetry |
| TÊTA B | Degrees | Angle between the leg and the vertical axis (negative) at the point of return. |
| TÊTA rB | Degrees | Angle between the arm and the vertical axis (positive) at the point of return. |
| C | Number | Angular speed arm on leg ratio. |
| TÊTA xB | Degrees | Angle between the leg and the horizontal axis at the point of return. |
| TÊTA xrB | Degrees | Angle between the arm and the horizontal axis at the point of return. |
| K | Number | Length dimension leg on arm ratio. |
| TÊTA | Degrees | Angle between the leg and the horizontal axis. |
| TÊTA min. | Degrees | Angle between the leg and the horizontal axis to obtain the minimal Y value (most negative). |
| Control = 0 | Number | Control variable for minimal Y value. |
| Y/r | Number | Y value (relative to the arm length) for TÊTA angle. |
| Y min./r | Number | Y value (relative to the arm length) for TÊTA min. angle. |
| TÊTA nom. | Degres | Angle between the leg and the horizontal axis to obtain the nominal Y value (symmetry position). |
| Ynom./r | Number | Y value (relative to the arm length) for TÊTA nom. angle. |
| DELTA Y/r | Number | Differential value between Y min and Y nom. (relative to the arm length). |
| (%Y) | Number | DELTA Y/r on Ynom./r percentage. |

The symmetry condition is that for a 180 degrees leg rotation, a multiple of 360 degrees arm rotation is required. The point of return condition is that for a 360 degrees leg rotation, a multiple of 360 degrees arm rotation is required.

In an embodiment, the different variables that affect the height are governed by the following equations in order to reduce the variation in height when the robot moves. In the following equations, "r" is the length of the arm, for example the arm 50 which is used for the control of height variation:

$C1: C1 = C2 \times 2$ $T\hat{E}TA\ B: T\hat{E}TA\ B = 180\ degres/N$ $T\hat{E}TA\ rB: T\hat{E}TA\ rB = 180\ degres \times (C1/N)$ $C: C = T\hat{E}TA\ rB/T\hat{E}TA\ B$ $T\hat{E}TA\ xB: T\hat{E}TA\ xB = 180\ degres \times (1,5 - (1/N))$ $T\hat{E}TA\ rB: T\hat{E}TA\ xrB = 180\ degres \times (2,5 - (C/N))$ $K: K = (1 - COS(C \times 180\ degres/N))/(1 - COS(180\ degres/N))$ $Y/r: Y/r = (K \times SIN(T\hat{E}TA)) + (SIN((T\hat{E}TA\ xrB + (C \times (T\hat{E}TA - T\hat{E}TA\ xB)))))$ $Ymin./r: Ymin./r = (K \times SIN(T\hat{E}TAmin.)) + (SIN((T\hat{E}TA\ xrB + (C \times (T\hat{E}TAmin. - T\hat{E}TA\ xB)))))$ $Ynom./r: Ynom./r = (K \times SIN(270\ degrés)) + (SIN((T\hat{E}TA\ xrB + (C \times (270\ degrés - T\hat{E}TA\ xB)))))$ $DELTA\ Y/r: DELTA\ Y/r = (Ymin./r) - (Ynom./r)$ $(\%Y): (\%Y) = ABSOLUTE\ VALUE\ (100 \times (DELTA\ Y/r)/(Ynom./r))$ Results of the height variations as a function of the different parameters that affect the height are shown in Annex 1.

Now turning to the variation in horizontal speed, the main variables that affect the horizontal speed are listed in Table 2.

TABLE 2

| Variable Name | Type | Description |
| --- | --- | --- |
| N | Number | Number of legs |
| C1 | Number | Condition 1: point of return |
| C2 | Number | Condition 2: symmetry |
| TÊTA B | Degrees | Angle between the leg and the vertical axis (negative) at the point of return. |
| TÊTA rB | Degrees | Angle between the arm and the vertical axis (positive) at the point of return. |
| C | Number | Angular speed arm on leg ratio. |
| TÊTA xB | Degrees | Angle between the leg and the horizontal axis at the point of return. |
| TÊTA xrB | Degrees | Angle between the arm and the horizontal axis at the point of return. |
| Kv | Number | Length dimension leg on arm ratio. |
| TÊTA | Degrees | Angle between the leg and the horizontal axis. |
| TÊTA max. | Degrees | Angle between the leg and the horizontal axis to obtain the maximum Vx value (most positive). |
| Control = 0 | Number | Control variable for maximum Vx value. |
| Vx/(rv x wr) | Number | Vx value (relative to the arm length x arm angular speed) for TÊTA angle. |
| Vx max./(rv x wr) | Number | Vx value (relative to the arm length x arm angular speed) for TÊTA max. angle. |
| TÊTA nom. | Degrees | Angle between the leg and the horizontal axis to obtain the nominal Vx value (symmetry position). |
| Vx nom./(rv x wr) | Number | Vx value (relative to the arm length x arm angular speed) for TÊTA nom. angle. |

TABLE 2-continued

| Variable Name | Type | Description |
|---|---|---|
| DELTA Vx/(rv x wr) | Number | Differential value between Vx max. and Vx nom. (relative to the arm length x arm angular speed). |
| (% Vx) | Number | DELTA Vx/(rv x wr) on Vx nom./(rv x wr) percentage. |

The symmetry condition is that for a 180 degrees leg rotation, a multiple of 360 degrees arm rotation is required. C2 is an integer equal to or greater than one. The point of return condition is that for a 360 degrees leg rotation, a multiple of 360 degrees arm rotation is required. The point of return variable C1 has to fulfill the symmetry condition variable C2 to be valid.

In an embodiment, the relationship between the different variables is governed by the following equations, in order to reduce the variation in horizontal speed. In the following equations, rv is the length of the arm, for example the arm 48 which is used to control the horizontal speed of the leg, and wr is the angular speed of arm 48.

$C1: C1 = C2 \times 2$ $TÊTA\ B: TÊTA\ B = 180\ degrees/N$ $TÊTA\ rB: TÊTA\ rB = 180\ degrees \times (C1/N)$ $C: C = TÊTA\ rB/TÊTA\ B$ $TÊTA\ xB: TÊTA\ xB = 180\ degrees \times (1,5 - (1/N))$ $TÊTA\ rB: TÊTA\ xrB = 180\ degrees \times (2,5 - (C/N))$ $Kv: Kv = ((1 - COS(C \times 180\ degrees/N))/(1 - COS(180\ degrees/N)) \times C$ $Vx/(rv \times wr): Vx/(rv \times wr) = -((Kv \times SIN(TÊTA)) + ((SIN((TÊTA\ xrB + (C \times (TÊTA - TÊTA\ xB)))) \times C))/C$ $Vx max./(rv \times wr): Vx max./(rv \times wr) = -((Kv \times SIN(TÊTA min.)) + ((SIN((TÊTA\ xrB + (C \times (TÊTA min. - TÊTA\ xB)))) \times C))/C$ $Vx\ nom./(rv \times wr): Vx\ nom./(rv \times wr) = -((Kv \times SIN(270\ degrés)) + ((SIN((TÊTA\ xrB + (C \times (270\ degrés - TÊTA\ xB)))) \times C))/C$ $DELTA\ Vx/(rv \times wr): DELTA\ Vx/(rv \times wr) = (Vx min./(rv \times wr)) - (Vx\ nom./(rv \times wr))$ $(\%Vx): (\%Vx) = ABSOLUTE\ VALUE\ (100 \times (DELTA\ Vx/(rv \times wr))/(Vx\ nom./(rv \times wr)))$ Results of the horizontal speed variations as a function of the different parameters that affect the horizontal speed are shown in Annex 2.

It should be noted that in the exemplary robot illustrated in FIGS. 1 to 13, the number of legs N=3, C2=1 and C1=2. Therefore, the speed and height variations are 6.25%, as shown in Annexes 1 & 2. However, as discussed above, the design is not limited to these conditions. Other variations may be made without departing from the scope of the disclosure.

The robot described in these embodiments may be used in various domains that range from medical applications, to heavy industries. For instance, the robot may be used for human re-habilitation after an injury, or in the household to move objects on the same floor or at different floors. It may also be used in heavy machine industries such as in bulldozers, and lifting machines.

While preferred embodiments have been described above and illustrated in the accompanying drawings, it will be evident to those skilled in the art that modifications may be made without departing from this disclosure. Such modifications are considered as possible variants comprised in the scope of the disclosure.

Annex 1

| N | C2 | C1 | TÊTA B | TÊTA rB | C | TÊTA xB | TÊTA xrB | K | TÊTA min. > TÊTA xB | Control = 0 | Y min./r | TÊTA nom. | Control = 0 | Ynom./r | DELTA Y/r | (% Y) |
|---|---|---|---|---|---|---|---|---|---|---|---|---|---|---|---|---|
| 2 | 1 | 2 | 90.00 | 180.00 | 2.00 | 180.00 | 270.00 | 2.00 | 210.00 | 0.00 | −1.50 | 270.00 | 0.00 | −1.00 | −0.50 | 50.00 |
| 3 | 1 | 2 | 60.00 | 120.00 | 2.00 | 210.00 | 330.00 | 3.00 | 228.60 | 0.00 | −2.12 | 270.00 | 0.00 | −2.00 | −0.12 | 6.25 |
| 3 | 2 | 4 | 60.00 | 240.00 | 4.00 | 210.00 | 210.00 | 3.00 | 231.90 | 0.00 | −3.25 | 270.00 | 0.00 | −2.00 | −1.25 | 62.35 |
| 4 | 1 | 2 | 45.00 | 90.00 | 2.00 | 225.00 | 360.00 | 3.41 | 238.50 | 0.00 | −2.46 | 270.00 | 0.00 | −2.41 | −0.04 | 1.78 |
| 4 | 2 | 4 | 45.00 | 180.00 | 4.00 | 225.00 | 270.00 | 6.83 | 239.80 | 0.00 | −6.41 | 270.00 | 0.00 | −5.83 | −0.59 | 10.04 |
| 5 | 1 | 2 | 36.00 | 72.00 | 2.00 | 234.00 | 378.00 | 3.62 | 245.00 | 0.00 | −2.64 | 270.00 | 0.00 | −2.62 | −0.02 | 0.70 |
| 5 | 2 | 4 | 36.00 | 144.00 | 4.00 | 234.00 | 306.00 | 9.47 | 245.35 | 0.00 | −8.76 | 270.00 | 0.00 | −8.47 | −0.29 | 3.38 |
| 6 | 1 | 2 | 30.00 | 60.00 | 2.00 | 240.00 | 390.00 | 3.73 | 249.00 | 0.00 | −2.74 | 270.00 | 0.00 | −2.73 | −0.01 | 0.33 |
| 6 | 2 | 4 | 30.00 | 120.00 | 4.00 | 240.00 | 330.00 | 11.20 | 249.20 | 0.00 | −10.35 | 270.00 | 0.00 | −10.20 | −0.15 | 1.49 |

Annex 2

| N | C2 | C1 | TÊTA B | TÊTA rB | C | TÊTA xB | TÊTA xrB | Kv | TÊTA max. > TÊTA xB | Control = 0 | Vx max./(rv x wr) | TÊTA nom. | Control = 0 | Vx nom./(rv x wr) | DELTA Vx/(rv x wr) | (% Vx) |
|---|---|---|---|---|---|---|---|---|---|---|---|---|---|---|---|---|
| 2 | 1 | 2 | 90.00 | 180.00 | 2.00 | 180.00 | 270.00 | 4.00 | 210.00 | 0.00 | 1.50 | 270.00 | 0.00 | 1.00 | 0.50 | 50.00 |
| 3 | 1 | 2 | 60.00 | 120.00 | 2.00 | 210.00 | 330.00 | 6.00 | 228.60 | 0.00 | 2.12 | 270.00 | 0.00 | 2.00 | 0.12 | 6.25 |
| 3 | 2 | 4 | 60.00 | 240.00 | 4.00 | 210.00 | 210.00 | 12.00 | 231.90 | 0.00 | 3.25 | 270.00 | 0.00 | 2.00 | 1.25 | 62.35 |
| 4 | 1 | 2 | 45.00 | 90.00 | 2.00 | 225.00 | 360.00 | 6.83 | 238.50 | 0.00 | 2.46 | 270.00 | 0.00 | 2.41 | 0.04 | 1.78 |
| 4 | 2 | 4 | 45.00 | 180.00 | 4.00 | 225.00 | 270.00 | 27.31 | 239.80 | 0.00 | 6.41 | 270.00 | 0.00 | 5.83 | 0.59 | 10.04 |
| 5 | 1 | 2 | 36.00 | 72.00 | 2.00 | 234.00 | 378.00 | 7.24 | 245.00 | 0.00 | 2.64 | 270.00 | 0.00 | 2.62 | 0.02 | 0.70 |
| 5 | 2 | 4 | 36.00 | 144.00 | 4.00 | 234.00 | 306.00 | 37.89 | 245.35 | 0.00 | 8.76 | 270.00 | 0.00 | 8.47 | 0.29 | 3.38 |
| 6 | 1 | 2 | 30.00 | 60.00 | 2.00 | 240.00 | 390.00 | 7.46 | 249.00 | 0.00 | 2.74 | 270.00 | 0.00 | 2.73 | 0.01 | 0.33 |
| 6 | 2 | 4 | 30.00 | 120.00 | 4.00 | 240.00 | 330.00 | 44.78 | 249.20 | 0.00 | 10.35 | 270.00 | 0.00 | 10.20 | 0.15 | 1.49 |

The invention claimed is:

1. A robot for transforming a rotation movement into a vertical/horizontal displacement on the ground using legs, said robot comprising:
   a chassis;
   a rotation shaft connected to said chassis;
   a plurality of leg modules connected to said shaft at a first end for rotating around said shaft;
   a plurality of legs, each of said legs being rotatably attached to one of said leg modules at a second end opposite the first end;
   a mechanism for keeping a lower surface of said legs horizontal to the ground as the robots rotates around the rotation shaft for allowing the robot to move on flat surfaces as well to climb stairs;
   wherein the leg is connected to the leg module using an arm and the mechanism is a gearing mechanism for controlling the rotation of the leg around the arm at a speed and orientation that allow the lower surface of the leg to remain parallel to the ground as the leg rotates.

2. A robot as recited in claim 1, wherein the number of leg modules is two or more.

3. A robot as recited in claim 2, wherein the number of leg modules is three.

4. A robot as recited in claim 1, wherein at least one of the legs is rotatably attached to the corresponding leg module to keep its lower surface parallel to the ground by force of gravity.

5. A robot as recited in claim 4, wherein the at least one leg is triangular shaped.

6. A robot as recited in claim 4, wherein the robot is capable of moving on an inclined surface.

7. A robot as recited in claim 1, wherein the leg modules are synchronized with each other.

8. A robot as recited in claim 7, wherein the leg modules are provided at equal angles around the rotation shaft.

9. A robot for transforming a rotation movement into a vertical/horizontal displacement on the ground using legs, said robot comprising:
   a chassis;
   a rotation shaft connected to said chassis;
   a plurality of leg modules connected to said shaft at a first end for rotating around said shaft;
   a plurality of legs, each of said legs being rotatably attached to one of said leg modules at a second end opposite the first end;
   a first mechanism for controlling height variation introduced to the legs by the movement of the robot;
   a second mechanism for controlling the orientation of the legs to keep a lower surface of said legs parallel to the ground; and
   a third mechanism for controlling a horizontal speed of the legs to compensate for the rotation of the leg module to which the leg is connected.

10. A robot as recited in claim 9, wherein the second and third mechanisms are provided on a first side of the leg.

11. A robot as recited in claim 10, wherein the first mechanism is provided at a second side of the leg opposite the first side.

* * * * *